Nov. 20, 1962 M. ZION 3,064,588
TOY RAILWAY TRUCK
Filed Dec. 14, 1959
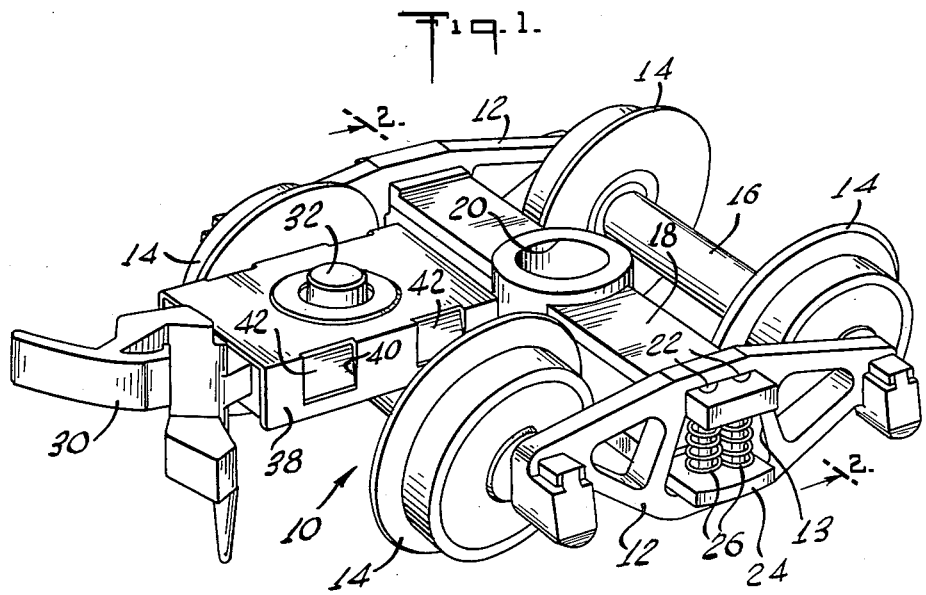
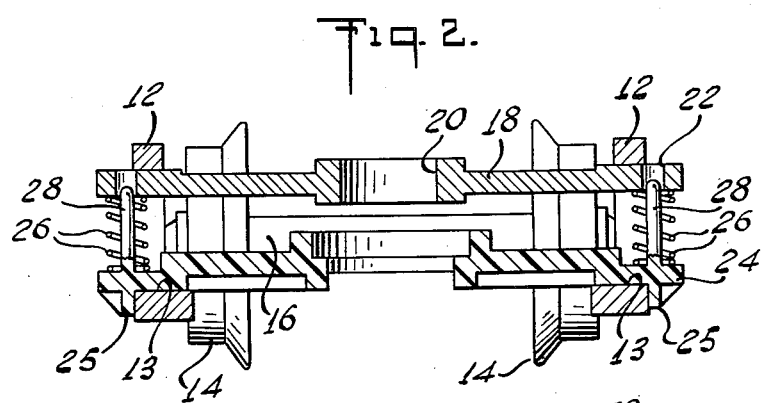
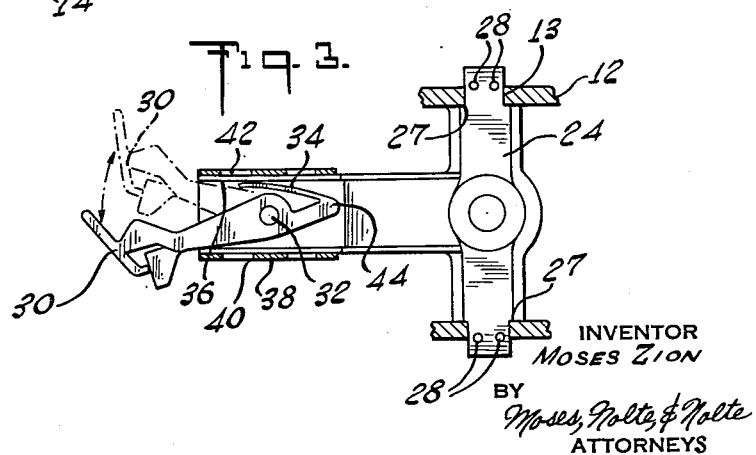
INVENTOR
MOSES ZION
BY
Moses, Nolte & Nolte
ATTORNEYS 3,064,588
Patented Nov. 20, 1962

3,064,588
TOY RAILWAY TRUCK
Moses Zion, Brooklyn, N.Y., assignor to The Lionel Corporation, New York, N.Y., a corporation of New York
Filed Dec. 14, 1959, Ser. No. 859,275
7 Claims. (Cl. 105—182)

This invention relates in general to miniature railroad truck and coupler assemblies and in particular to a fully sprung, low cost assembly employing a minimum of parts while maintaining the utmost in realism.

More specifically, the invention is described in connection with a familiar type of railroad freight car truck employing a conventional N.M.R.A. simulated coupler which will be easily recognizable by those skilled in the art.

The coupler assembly is of the self-locking claw type wherein upon abutment with a similar coupler on an adjacent car, locking engagement is obtained. The self-locking characteristic of the miniature N.M.R.A. coupler is obtained by the spring biasing of each coupler to an extreme of its pivotal movement so that upon abutment, opposite claw faces will be self-latching.

The improved an simplified spring supported truck assembly is comprised of a minimum of basic parts. Two truck side plates are employed which are spaced apart and secured together by an upper and a lower cross member. These cross members are spring separated by four load carrying springs retained on guide pins which are integral with the lower cross member. The lower cross member also has a forwardly projecting portion which provides the pivotal mount for the coupler. Between the side plates, a pair of axles are pivotally positioned with the wheels located thereon. The truck upper cross member or "bolster" contains a central hole which provides the pivotal attachment point with an associated railroad car body.

By employing the load carrying springs in this manner, they act in a dual capacity in that they not only spring cushion the load carrying upper cross member but also separate the upper and lower cross members within the truck side plate openings to thereby rigidly secure the entire truck assembly together. It should be noted that this is accomplished without recourse to normal securing means, such as screws or the usual spring clips.

It is, therefore, an object of the invention to provide an improved low cost truck assembly employing a minimum of parts and securing means.

Another object of the invention is to provide a realistic freight car truck employing a spring supported bolster.

A still further object of the invention is to provide a spring biased coupler assembly connected to the lower cross member of the improved truck assembly.

Still another object of the invention is to provide a truck and coupler assembly which is simple in design, realistic in appearance, durable in construction and economical to manufacture.

These and other more detailed and specific objects will be disclosed in the course of the following specification, reference being had to the accompanying drawings, in which:

FIG. 1 is a perspective view of the improved truck and coupler assembly;

FIG. 2 is a transverse vertical section taken along line 2—2 of FIG. 1; and

FIG. 3 is a top plan view of the truck lower cross member and coupler assembly in partial section.

Referring to the drawings in particular, a truck and coupler assembly 10 is shown having a pair of truck side plates 12. Located between these side plates in suitable pivot bearings are axles 16 which support the wheels 14. The truck side plates are provided with openings 13 through which protrude the ends of an upper and a lower cross member, designated 18 and 24 respectively. The upper cross member or bolster is the load supporting member on which a freight car or other similar device is pivotally mounted through the aperture 20. The lower cross member 24 of the truck is formed in a general T-shape and has a transverse portion which protrudes through the opening 13 in the side plate and terminates in a downwardly depending ear portion 25. The ear 25 outwardly limits transverse travel of the truck side plates. Also included on the lower cross member are shoulders 27 which abut against the inner surface of the truck side plates 12 to limit their inward travel. The T-shaped lower cross member is preferably molded of a durable plastic such as nylon and further includes upstanding guide pins 28 about which are located coiled compression springs 26. The upper cross member 18 is provided with suitable guide pin clearance holes 22 which are of a smaller diameter than the diameter of the coil spring 26. The coiled compression spring 26 thereby forces apart the upper and lower truck cross members to the dimensional limit of the side plate openings 13. The inward movement limiting shoulder 27 and the outward movement limiting ear portion 25 of the lower cross member are thereby forcibly urged downward to straddle the lower portion of the side plate opening 13 to create a rigid box-like assembly.

A forward projecting portion of the lower cross member 24 is adapted to mount an N.M.R.A. coupler upon a pivotal support 32. The coupler has an extending portion 44 which forms a lever arm to which the coupler biasing spring 34 is attached. This biasing spring is operatively associated with a coupler side wall portion 36 to bias the coupler to the position shown in full lines in FIG. 3. The coupler side wall 36 is also provided with cover securing projections 42 which are operatively engageable with the apertures 40 in the pivot cover 38. The coupler 30 is preferably molded from a durable plastic such as nylon and has formed integral therewith the extension portion 44 and the bias spring portion 34. It can be seen that the provision of the bias spring in this manner, formed from the nylon plastic, produces a simple one piece coupler assembly.

To assemble the truck, the coil springs are first placed over the guide pins 28. The upper cross member is then used to compress the springs while the axles are positioned and the side plates are snapped over the ends of the cross members to form the completed truck assembly.

From the foregoing, it can be seen that the invention has provided a simple, easy to assemble low cost miniature train truck. The truck employs a floating spring supported upper cross member or bolster which adds realism to the truck and also acts to cushion the car. Integrally connected to the lower cross member of the truck assembly is the spring biased coupler. The biasing of the coupler in a uniform direction will provide automatic engagement with a similar abutting coupler of an adjacent railroad car.

Of course, it should be realized that the invention is not limited to the specific type of coil spring shown because those skilled in the art will readily see that a leaf spring or other resilient means could be substituted for the coil spring.

While a specific embodiment of the invention has been shown and described in detail to illustrate the application of the invention principles, it will be understood that the invention may be embodied otherwise without departing from such principles.

What is claimed is:

1. A miniature railroad car supporting truck and coupler assembly comprising, two truck side plates each having a substantially rectangular opening therein defined by upper and lower edges and a pair of side edges, wheel means mounted on axles connected between the ends of said truck side plates, a truck lower cross member having ends projecting into said side plate openings, upstanding guide pins at each end of said lower cross member, a truck upper cross member having ends projecting into said side plate openings and apertures adapted to freely receive said upstanding guide pins, spring support means between said upper cross member and said lower cross member normally holding said members respectively in contact with the upper and lower edges of said side plate openings, said guide pins being of sufficient length to engage the apertures in said upper cross member for all vertical positions of said upper cross member.

2. A miniature railroad car supporting truck and coupler assembly comprising, two truck side plates each having an opening therein, said openings including substantially parallel upper and lower edges, wheel means mounted on axles connected between the ends of said truck side plates, a truck lower cross member having ends projecting into said side plate openings, upstanding guide pins at each end of said lower cross member, a truck upper cross member having ends projecting into said side plate openings and apertures adapted to freely receive said upstanding guide pins, said guide pins being of sufficient length to engage the apertures in said upper cross member for all vertical positions of said upper cross member, and coil spring means in compression located around each of said guide pins normally urging the ends of said upper and lower cross members respectively against the upper and lower edges of said side plate openings.

3. A miniature railroad car supporting truck and coupler assembly comprising, two truck side plates each having a centrally located opening, each opening including substantially parallel upper and lower boundaries, wheel means mounted on axles connected between the ends of said truck side plates, a truck lower cross member extending between opposite side plate openings, a pair of upstanding guide pins at each end of said lower cross member, a truck upper cross member having apertures therein in registry with said guide pins and freely slidable thereover, said upper cross member extending between opposite truck side plate openings, coil spring means in compression about each of said guide pins normally urging said upper and lower cross members respectively against the upper and lower boundaries of said side plate openings, said guide pins being of a length sufficient to engage said apertures to thereby restrain lateral movement of said upper cross member, and spring biased car coupling means connected to said truck lower cross member.

4. A miniature railroad car supporting truck and coupler assembly according to claim 3, wherein said spring biased car coupling means includes a claw-like molded nylon coupler pivotally mounted on an upstanding portion of said lower cross member, a coupler extension projecting substantially beyond said pivotal mount and a resilient arcuate spring biasing means integrally formed with said coupler extension whereby said coupler is urged to an automatically connecting position when combined with a similarly urged coupler.

5. A miniature railroad car truck assembly comprising two truck side plates each having a centrally located opening, each opening including substantially parallel upper and lower boundaries, wheel means mounted on axles connected between the truck side plates, a truck upper cross member extending into said opposite side plate openings, a lower cross member extending into said side plate openings and having portions overlying the openings in said plates thereby transversely locating said side plates in spaced parallel relation, said overlying portions including shoulder means contacting the inner surface of each of said side plates, and flange means contacting the outer surface of each of said side plates, guide pins on one of said cross members extending into apertures in said other cross member to limit lateral movement of said upper cross member with respect to said lower cross member and spring means in compression between said cross members normally urging said cross member respectively against the upper and lower boundaries of the side plate openings.

6. A frame for a toy train truck assembly comprising two truck side plates each having a centrally located opening, each opening including substantially parallel upper and lower boundaries, a lower cross member extending into said side plate openings, an upper cross member in substantial vertical alignment with said lower cross member extending into said openings, said lower cross members including shoulder means in abutment with the inside surfaces of said side plates and projecting boss portions in contacting relation with the outside surface of said side plates, guide pins on one of said cross members extending into apertures in said other cross member, said guide pins being of sufficient length to engage the apertures in the other cross member to limit lateral movement of said upper cross member with respect to said lower cross member, and spring means in compression normally urging said cross members against the upper and lower boundaries of said side plate openings, whereby said cross member shoulder means and bosses engage said side plates to maintain them in unitary assembled spaced relation.

7. A combined truck and coupler assembly for a toy train comprising two spaced upstanding truck side plates each having a centrally located substantially rectangular opening therein defined by upper and lower edges and a pair of side edges, a lower cross member passing through said openings, said cross member having side plate retaining means at each end thereof, said retaining means including shoulder portions in abutment with the inside surfaces of said side plates and projecting boss portions in contacting relation with the outside surface of said side plates below the lower edges of said openings, a bolster above said cross member extending into said openings, a pair of upstanding guide pins at each end of said lower cross member extending upwardly into apertures in said bolster to limit lateral movement of said bolster with respect to said lower cross member during vertical movement of said bolster, cylindrical coil springs in compression about said pins urging said bolster and said cross member, respectively, against the upper and lower edges of said openings, a car coupler connected to said lower cross member, said coupler including a molded plastic claw mounted for horizontal pivotal movement relative to said cross member, said claw including an integral resilient arcuate portion to bias said claw into a coupler-engaging position.

References Cited in the file of this patent

UNITED STATES PATENTS

| | | |
|---|---|---|
| 799,315 | Edwards | Sept. 12, 1905 |
| 1,475,179 | Floyd | Nov. 27, 1923 |
| 2,453,915 | Howard | Nov. 16, 1948 |
| 2,556,952 | Wojtowicz | June 12, 1951 |
| 2,658,629 | Pettit | Nov. 10, 1953 |
| 2,661,852 | Bonanno | Dec. 8, 1953 |
| 2,677,916 | Hannapel | May 11, 1954 |
| 2,717,559 | Janeway | Sept. 13, 1955 |
| 2,872,051 | Dunbar | Feb. 3, 1959 |